United States Patent
Wu et al.

(10) Patent No.: US 11,908,113 B2
(45) Date of Patent: Feb. 20, 2024

(54) IMAGE PROCESSING METHOD AND IMAGE PROCESSING DEVICE USING THE SAME

(71) Applicant: Cvitek Co. Ltd., Beijing (CN)

(72) Inventors: Jen-Shi Wu, Zhubei (TW); Hsin-Hui Chen, Taipei (TW)

(73) Assignee: CVITEK CO. LTD., Beijing (CN)

( * ) Notice: Subject to any disclaimer, the term of this patent is extended or adjusted under 35 U.S.C. 154(b) by 358 days.

(21) Appl. No.: 17/519,415

(22) Filed: Nov. 4, 2021

(65) Prior Publication Data
US 2022/0164932 A1    May 26, 2022

(30) Foreign Application Priority Data
Nov. 20, 2020 (CN) .......................... 202011311396.3

(51) Int. Cl.
*G06T 5/40* (2006.01)
*G06T 5/50* (2006.01)
*G06T 5/00* (2006.01)

(52) U.S. Cl.
CPC ................ *G06T 5/40* (2013.01); *G06T 5/009* (2013.01); *G06T 5/50* (2013.01)

(58) Field of Classification Search
None
See application file for complete search history.

(56) References Cited

U.S. PATENT DOCUMENTS

| | | | | |
|---|---|---|---|---|
| 7,164,787 B1* | 1/2007 | Nevis | ...................... | G01S 17/89 348/42 |
| 7,164,788 B1* | 1/2007 | Nevis | ........................ | G06T 5/40 348/42 |
| 7,885,462 B2* | 2/2011 | Paik | ........................ | G06T 5/40 382/254 |
| 8,159,616 B2* | 4/2012 | Norgaard | ................ | G06T 5/009 348/672 |
| 9,691,139 B2* | 6/2017 | Usman | ................. | H04N 1/6019 |

(Continued)

OTHER PUBLICATIONS

Karel Zuiderveld, "Contrast Limited Adaptive Histogram Equalization," VIII.5, Computer Vision Research Group, Utrecht University, Utrecht, The Netherlands, 1994, pp. 474-485, Academic Press, Inc.

(Continued)

*Primary Examiner* — Anand P Bhatnagar
(74) *Attorney, Agent, or Firm* — Innovation Counsel LLP

(57) ABSTRACT

An image processing method includes: (a) receiving a to-be-processed image; (b) obtaining a target brightness of the to-be-processed image; (c) creating a histogram curve of the to-be-processed image; (d) clipping the histogram curve according to a clipping value; (e) obtaining a mapping function of the clipped histogram curve; (f) obtaining a mapped image mapped according to the mapping function; (g) obtaining an average brightness of the mapped image; (h) obtaining a difference between the target brightness and the average brightness; and (i) if the difference is greater than a threshold, adjusting the clipping value and repeating steps (d) to (i) until the difference is less than the threshold. Thus, if the to-be-processed image does not reach the target brightness, the image processing device automatically repeats steps (c) to (i) until the to-be-processed image reaches the target brightness.

18 Claims, 6 Drawing Sheets

(56) References Cited

U.S. PATENT DOCUMENTS

| | | | | |
|---|---|---|---|---|
| 10,027,965 B2* | 7/2018 | Mertens | ............... | H04N 19/30 |
| 10,057,600 B2* | 8/2018 | Mertens | ............... | H04N 19/46 |
| 10,096,092 B2* | 10/2018 | Nakamae | ............... | G06T 5/003 |
| 2005/0200762 A1* | 9/2005 | Barletta | ............... | G06F 16/785 |
| | | | | 348/700 |
| 2007/0014470 A1* | 1/2007 | Sloan | ............... | G06T 5/009 |
| | | | | 382/162 |
| 2012/0188414 A1* | 7/2012 | Ross | ............... | H04N 25/60 |
| | | | | 348/241 |
| 2015/0117791 A1* | 4/2015 | Mertens | ............... | H04N 19/102 |
| | | | | 382/239 |
| 2015/0294180 A1* | 10/2015 | Hong | ............... | G06T 5/009 |
| | | | | 382/168 |
| 2016/0335750 A1* | 11/2016 | Usman | ............... | G06T 5/008 |
| 2017/0127069 A1* | 5/2017 | Mertens | ............... | H04N 19/196 |

OTHER PUBLICATIONS

Samuel W. Hasinoff et al., "Burst photography for high dynamic range and low-light imaging on mobile cameras," ACM Trans. Graph., Nov. 2016, pp. 192:1-192:12, vol. 35, No. 6, Article 192.

* cited by examiner

IMAGE PROCESSING METHOD AND IMAGE PROCESSING DEVICE USING THE SAME

This application claims the benefit of People's Republic of China application Serial No. 202011311396.3, filed on Nov. 20, 2020, the subject matter of which is incorporated herein by reference.

BACKGROUND OF THE INVENTION

Field of the Invention

The invention relates in general to a processing method and a processing device using the same, and more particularly to an image processing method and an image processing device using the same.

Description of the Related Art

The main target of image video enhancement is for increasing image brightness, contrast and detail for improving the definition of an image to benefit subsequent applications such as video surveillance and monitoring, vehicle license plate recognition, facial recognition, target tracking, etc. Although the enhancement method based on classical histogram equalization has been widely used due to its features of simplicity and promptness, image noise and overall brightness may be over-enhanced.

Therefore, it has become a prominent task for the industries to provide a new image processing method and an image processing device using the same to resolve the above mentioned problems.

SUMMARY OF THE INVENTION

The invention is directed to an image processing method and an image processing device using the same capable of resolving the above problems.

According to one embodiment of the present invention, an image processing method is provided. The image processing method includes the following steps: (a) receiving a to-be-processed image; (b) obtaining a target brightness of the to-be-processed image; (c) creating a histogram curve of the to-be-processed image; (d) clipping the histogram curve according to a clipping value; (e) obtaining a mapping function of the clipped histogram curve; (f) obtaining a mapped image mapped according to the mapping function; (g) obtaining an average brightness of the mapped image; (h) obtaining a difference between the target brightness and the average brightness; and (i) if the difference is greater than a threshold value, adjusting the clipping value and repeating steps (d) to (i) until the difference is less than the threshold value.

According to another embodiment of the present invention, an image processing device is provided. The image processing device includes an input port and a processor. The input port is configured to (a) receive a to-be-processed image. The processor is configured to (b) obtain a target brightness of the to-be-processed image; (c) create a histogram curve of the to-be-processed image; (d) clip the histogram curve according to a clipping value; (e) obtain a mapping function of the clipped histogram curve; (f) obtain a mapped image mapped according to the mapping function; (g) obtain an average brightness of the mapped image; (h) obtain a difference between the target brightness and the average brightness; and (i) if the difference is greater than a threshold value, adjust the clipping value and repeat step (c) to step (i) until the difference is less than the threshold value.

The above and other aspects of the invention will become better understood with regard to the following detailed description of the preferred but non-limiting embodiment (s). The following description is made with reference to the accompanying drawings.

DETAILED DESCRIPTION OF THE INVENTION

Detailed descriptions of the structural and operation principles of the present invention are disclosed below with accompanying drawings.

Figure 1:
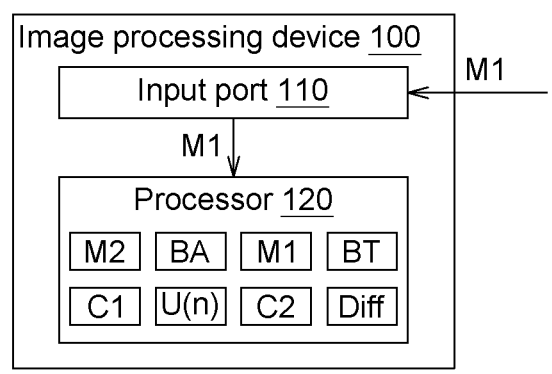
FIG. 1 is a functional block diagram of an image processing device according to an embodiment of the present invention.

Referring to FIG. 1, a functional block diagram of an image processing device 100 according to an embodiment of the present invention is shown. The image processing device 100 includes an input port 110 (or receiver) and a processor 120. The image processing device 100 could be realized by an electronic device capable of processing images, such as a notebook PC, a desktop PC, a tablet PC, or a communication device (such as a mobile phone). The input port 110 could be connected to an external electronic device (not illustrated in the diagram) for receiving images from the external electronic device. Or, the image processing device 100 could be realized by a camera capable of receiving an external light to sense external images. The processor 120 could be realized by an integrated circuit, formed using semiconductor process, such as a semiconductor chip or a semiconductor package.

The input port 110 is configured to (a) receive a to-be-processed image M1. The processor 120 is configured to (b) obtain a target brightness BT of the to-be-processed image M1; (c) create a histogram curve C1 of the to-be-processed image M1; (d) clip histogram curve C1 according to a clipping value U(n); (e) obtain a mapping function D1 of the clipped histogram curve C2; (f) obtain a mapped image M2 mapped according to the mapping function D1; (g) obtain an average brightness BA of the mapped image M2; (h) obtain a difference Diff between the target brightness BT and the average brightness BA; and (i) if the difference Diff is greater than a threshold value, adjust the clipping value U(n) and repeat step (c) to step (i) until the difference Diff is less than the threshold value. Thus, if the to-be-processed image M1 does not reach the target brightness BT, without manual adjustment, the image processing device 100 could automatically repeat step (c) to step (i) until the to-be-processed image M1 reaches the target brightness.

Detailed steps of the image processing method of the image processing device 100 are disclosed below with accompanying drawing FIG. 2.

Figure 2:
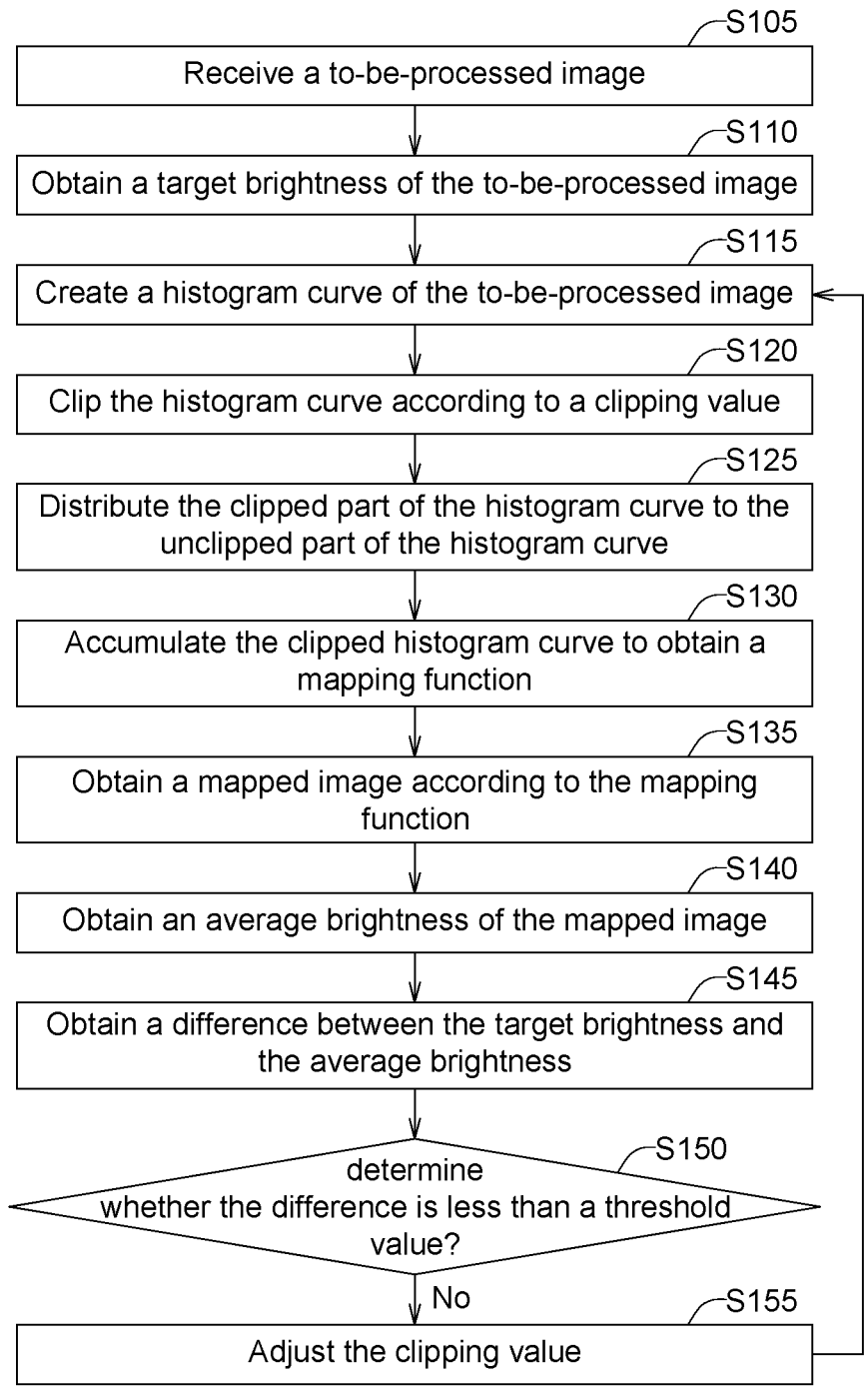
FIG. 2 is a flowchart of an image processing method of the image processing device of FIG. 1.

FIG. 2 is a flowchart of an image processing method of the image processing device 100 of FIG. 1.

Figure 3A:
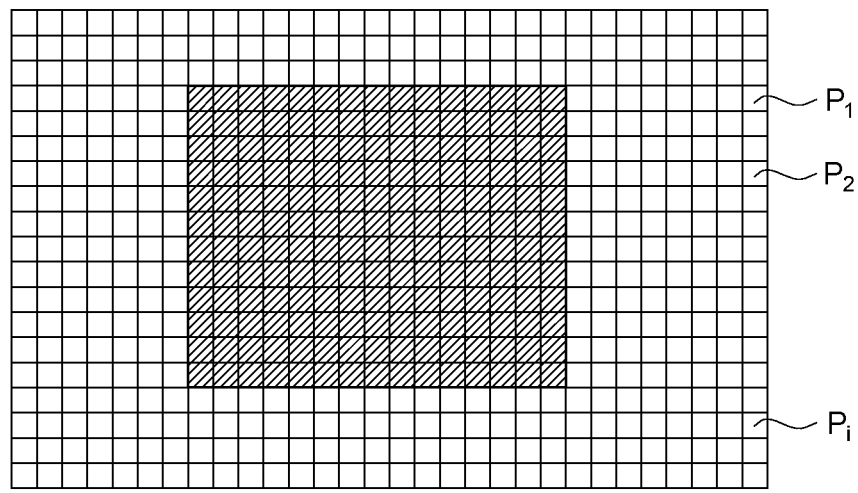
FIG. 3A is a schematic diagram of a to-be-processed image of FIG. 1.

In step S105, referring to FIG. 3A, a to-be-processed image M1 is received by the input port 110. The to-be-processed image M1 includes several pixels P1, P2, ..., Pi, wherein each pixel Pi has a brightness (or gray level value), and any two of the several pixels Pi may have identical or different brightness. The brightness, which could be divided into, for example, 256 levels, is represented by the level value within a range of 0 to 255, wherein the $0^{th}$ level represents black, and the $255^{th}$ level represents white. The subscript of Pi, that is, i, represents the $i^{th}$ pixel. The total number of pixels Pi depends on the resolution and/or size of the to-be-processed image M1 and is not subjected to specific restrictions in the present invention. For example, if the resolution of the to-be-processed image M1 is 100×100, then the total number of pixel Pi is 10000, wherein i is any number within the range of 1 to 10000.

In step S110, a target brightness BT of the to-be-processed image M1 is obtained by the processor 120. For example, the processor 120 is configured to (1) calculate the brightness of each pixel Pi on the to-be-processed image M1 to obtain an average brightness BA; (2) the target brightness is α times the average brightness BA, wherein the value of α is a real number less than, equivalent to, or greater than 1.

Figure 3B:
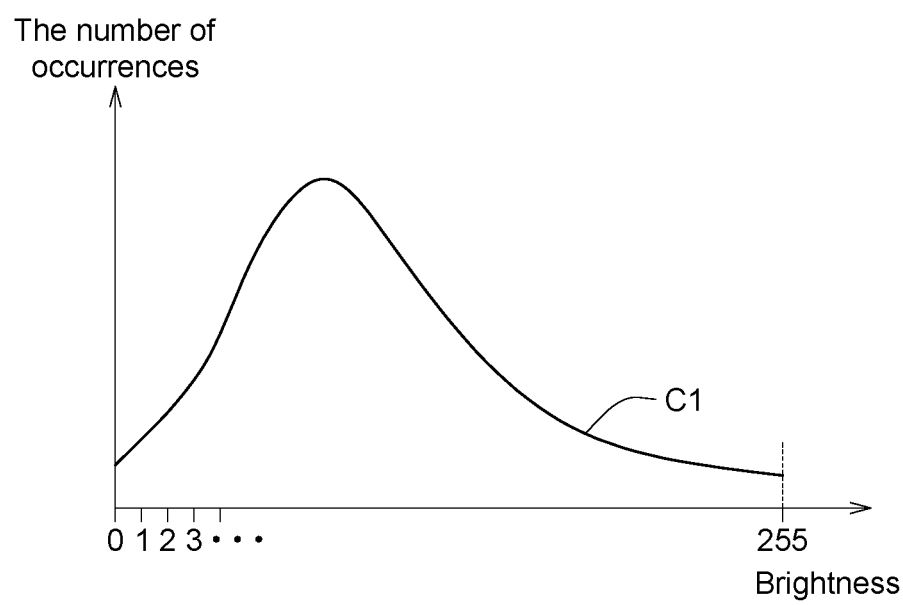
FIG. 3B is a schematic diagram of a histogram curve of the to-be-processed image of FIG. 3A.

In step S115, referring to FIG. 3B, a histogram curve C1 of the to-be-processed image M1 is created by the processor 120.

Figure 3C:
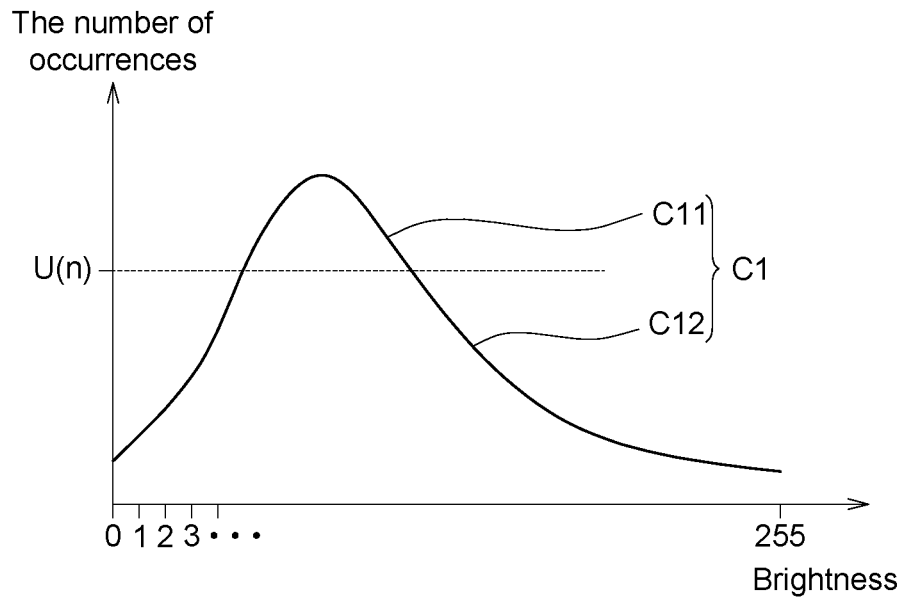
FIG. 3C is a schematic diagram of the histogram curve of FIG. 3B clipped according to a clipping value.

In step S120, referring to FIG. 3C, a histogram curve C1 is clipped by the processor 120 according to a clipping value U(n). As indicated in FIG. 3C, the portion C11 of the histogram curve C1 above the clipping value U(n) represents a clipped part of the histogram curve C1; the portion C12 of the histogram curve C1 below the clipping value U(n) represents an unclipped (or reserved) part of histogram curve C1; and n represents the number of iterations. For example, n=1 represents the $1^{st}$ iteration, n=2 represents the $2^{nd}$ iteration, ..., and the rest could be obtained by the same analogy. Besides, as indicated in formula (1), the clipping value U(1) (initial clipping value) for the $1^{st}$ iteration is a fixed value step_1. The $1^{st}$ iteration could be the $1^{st}$ iteration of steps S105 to S155. In the subsequent n iterations (of steps S115 to S155), the clipping value U(n) could be adjusted according to the processing result of the mapped image M2.

$$U(1) = step\_1 \qquad (1)$$

Figure 3D:
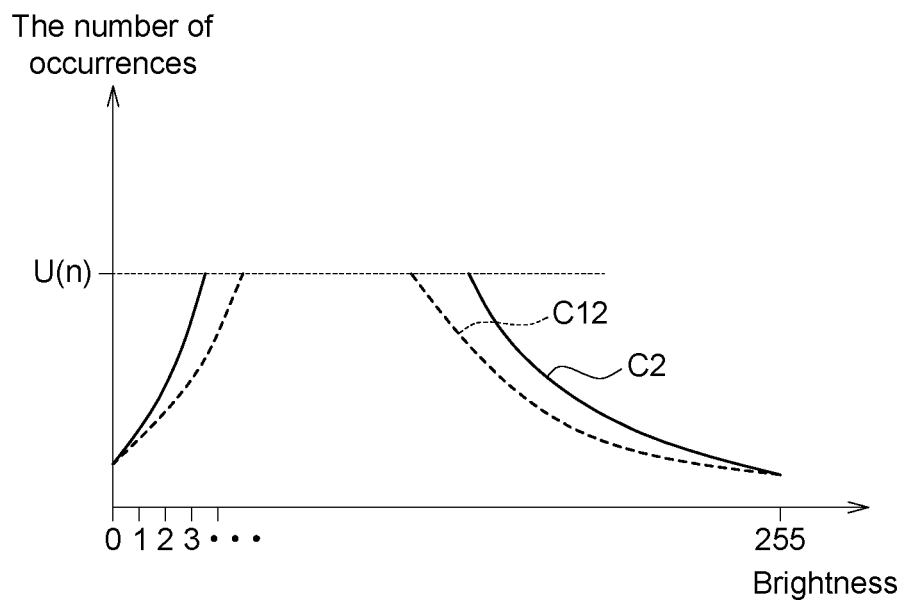
FIG. 3D is a schematic diagram of a histogram curve obtained by distributing the clipped part to the unclipped part of the histogram curve of FIG. 3C.

In step S125, referring to FIG. 3D, the unclipped portion C12 of the histogram curve C1 is represented by dotted lines, and the histogram curve C2 is represented by solid lines. In this step, the clipped portion C11 of the histogram curve C1 is distributed to the unclipped portion C12 of the histogram curve C1 by the processor 120 to form the clipped histogram curve C2. After distribution, the shape of the histogram curve C2 changes.

Figure 3E:
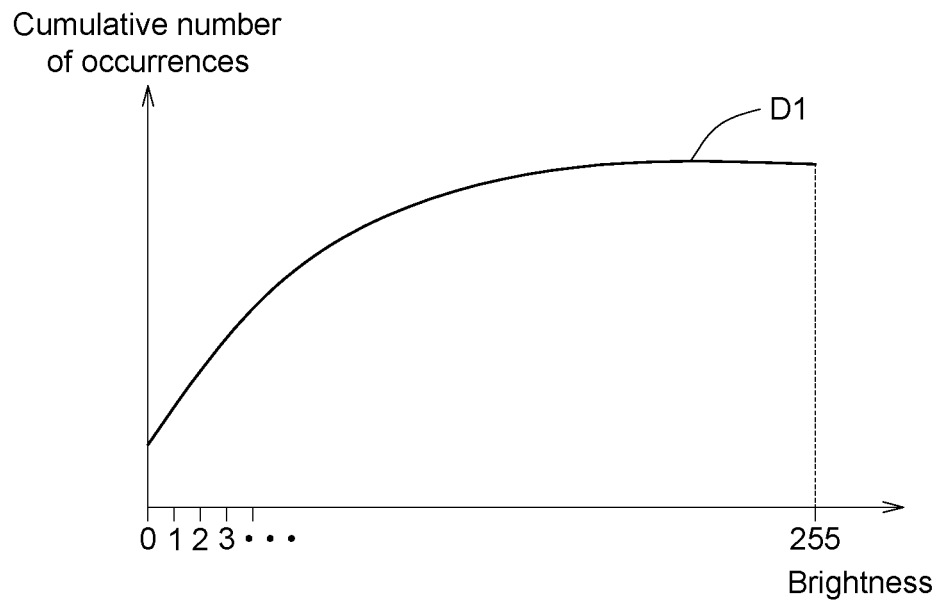
FIG. 3E is a schematic diagram of a mapping function of the clipped histogram curve of FIG. 3D.

In step S130, referring to FIG. 3E, the horizontal axis represents brightness, and the vertical axis represents the cumulative value of the number of occurrences of each brightness level. In this step, a mapping function D1 of the clipped histogram curve C2 is obtained by the processor 120. In an embodiment, the mapping function D1 could be a cumulative value of the number of occurrences of each brightness level. For example, the processor 120 is configured to (1) accumulate the number of occurrences from the $0^{th}$ brightness level to the $n^{th}$ brightness level; (2) use the accumulated number of occurrences as the cumulative value of the $n^{th}$ brightness level. For example, the number of occurrences of the $0^{th}$ brightness level is 2; the number of occurrences of the $1^{st}$ brightness level is 3; and the number of occurrences of the $2^{nd}$ brightness level is 5. For example, the number of occurrences of the $0^{th}$ brightness level is 2, therefore the processor 120 uses 2 as the cumulative value of the $0^{th}$ brightness level; the number of occurrences from the $0^{th}$ brightness level to the $1^{st}$ brightness level is 5 (2+3=5), therefore the processor 120 uses 5 as the cumulative value of the $1^{st}$ brightness level; the number of occurrences from the $0^{th}$ brightness level to the $2^{nd}$ brightness level is 10 (2+3+5=10), therefore the processor 120 uses 10 as the cumulative value of the $2^{nd}$ brightness level. By the same analogy, the cumulative value for each of the $0^{th}$ level to the $255^{th}$ brightness level could be obtained to evaluate the mapping function D1 of FIG. 3E. Besides, the maximum value of the y axis (cumulative occurrences) of the mapping function D1 could be a scaled value, and the cumulative value of each brightness level could be scaled according to the same scaling ratio, but the present invention is not limited thereto.

Figure 3F:
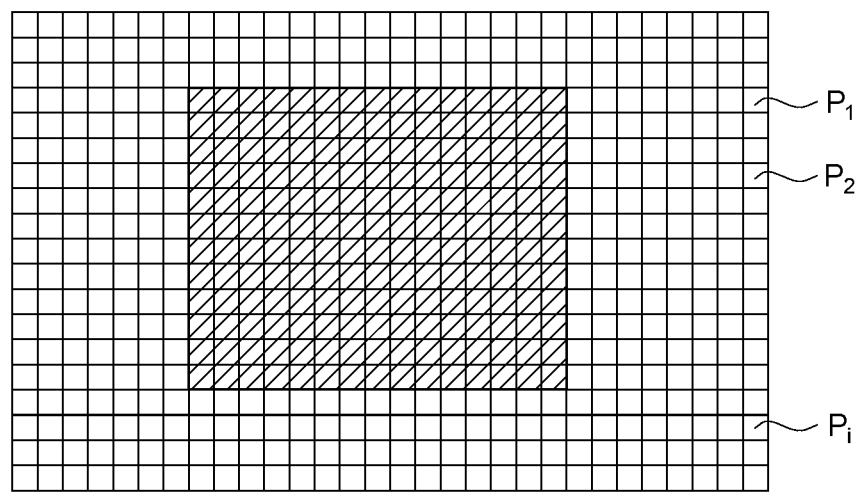
FIG. 3F is a schematic diagram of a mapped image obtained by mapping the to-be-processed image of FIG. 3A according to the mapping function.

In step S135, referring to FIG. 3F, the to-be-processed image M1 is mapped into a mapped image M2 according to the mapping function D1 by the processor 120. The brightness distribution, contrast and/or definition of several pixels Pi on the mapped image M2 are different from that of the several pixels Pi on the to-be-processed image M1. In comparison to the to-be-processed image M1, the mapped image M2 of FIG. 3F has different cross sections, this indicates that brightness, contrast and/or definition have changed.

In step S140, an average brightness BA of the mapped image M2 is obtained by the processor 120.

In step S145, a difference Diff between the target brightness BT and the average brightness BA is obtained by the processor 120 according to formula (a). The difference Diff is an absolute value of the difference between the target brightness BT and the average brightness BA.

$$Diff = |BT - BA| \qquad (a)$$

In step S150, whether the difference Diff is less than a threshold value is determined by the processor 120. The value of the threshold value is not subjected to specific restrictions in present invention but depends on the chromatic quality of the mapped image M2. If the determination is affirmative, this indicates that the display quality of the mapped image M2 meets the expectation, then the image processing process terminates, and the processor 120 could output the mapped image M2 to a storage device, display and/or digital file. If the determination is negative, this indicates that the display quality of the mapped image M2 does not meet the expectation, then the method proceeds to step S155.

In step S155, the clipping value U(n) for the next iteration is adjusted by the processor 120, and the method returns to step S115. In step S115, the mapped image M2 is processed according to the adjusted clipping value U(n).

Before proceeding to step S115, the processor 120 could replace the to-be-processed image M1 with the mapped image M2, such that in the next iteration, the image processed by the processor 120 is the mapped image M2.

In an embodiment, the processor 120 could repeat steps S115 to S155 until the difference Diff is less than the threshold value.

Details of how the processor 120 adjusts the clipping value U(n+1) for the next (the $(n+1)^{th}$) iteration of step S155 are disclosed below.

The processor 120 could adjust the clipping value U(n+1) for the next iteration according to the following formulas (2) to (4). Formulas (2) to (4) are applicable to the $2^{nd}$ iteration and onward (including the $2^{nd}$ iteration) (clipping value U(1) for the $1^{st}$ iteration is a fixed initial value step_1). The value of the initial value step_1 is not subjected to specific restrictions in the present invention and could be any real number depending on the to-be-processed image M1. In formulas (2) to (4), η(n) represents the adjustment rate for the $n^{th}$ iteration; k is an attenuation constant such as any real number less than 1; step(n+1) is the value of step adjustment for the $(n+1)^{th}$ iteration.

$$\eta(n+1) = k \times \eta(n) \quad (2)$$

$$\text{step } (n+1) = \eta(n+1) \times \text{step\_1} \quad (3)$$

$$U(n+1) = U(n) \pm \text{step } (n+1) \quad (4)$$

Formula (4) shows that the clipping value U(n+1) for the $(n+1)^{th}$ iteration is the clipping value U(n) for the $n^{th}$ iteration minus or plus the value of step(n+1), that is, the value of step adjustment for the $(n+1)^{th}$ iteration. When the clipping value U(n+1) decreases, the average brightness BV of the mapped image M2 obtained in the $(n+1)^{th}$ iteration could be reduced; when the clipping value U(n+1) increases, the average brightness BV of the mapped image M2 obtained in the $(n+1)^{th}$ iteration could be enhanced.

Figure 4:
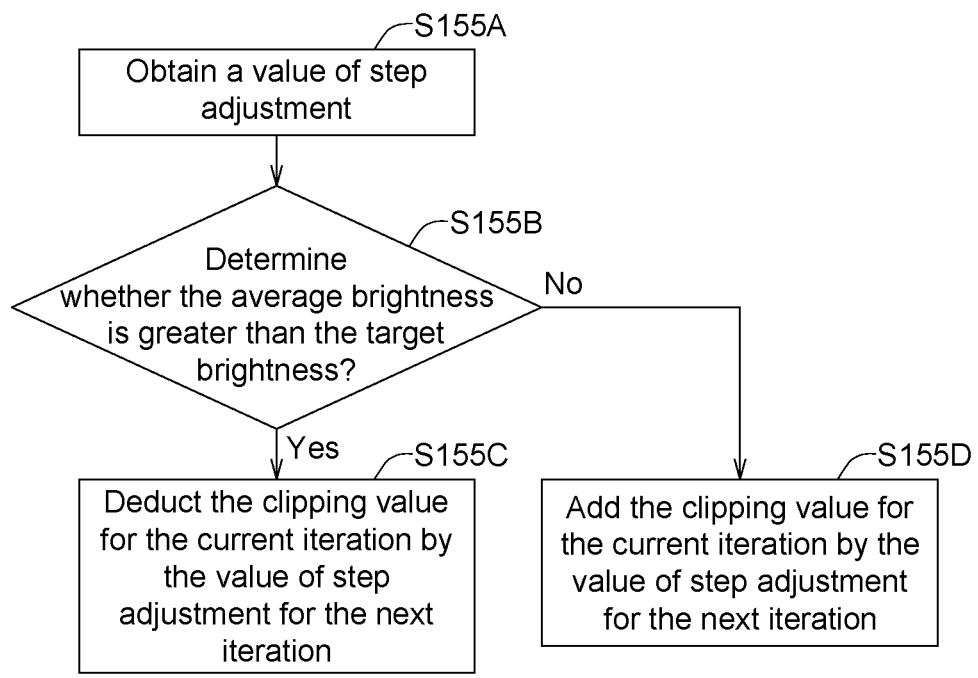
FIG. 4 is a flowchart of one of the implementations of the step of adjusting the clipping value of FIG. 2.

Details of how the current $(n^{th})$ iteration adjusts the clipping value U(n+1) in next (the $(n+1)^{th}$) iteration are illustrated in FIG. 4. Referring to FIG. 4, a flowchart of one of the implementations of the step 155 of adjusting the clipping value of FIG. 2 is shown.

In step S155A, in the $n^{th}$ iteration (current iteration), the value of step(n+1), that is, the value of step adjustment for the $(n+1)^{th}$ iteration (next iteration), is obtained by the processor 120 according to formulas (2) and (3).

In step S155B, in the $n^{th}$ iteration, whether average brightness BV is greater than the target brightness BT is determined by the processor 120. If the determination is affirmative, this indicates that the clipping value U(n+1) needs to be decreased to reduce the average brightness BV of the mapped image M2 obtained in the $(n+1)^{th}$ iteration, and the method proceeds to step S1550; if the determination is negative, this indicates that the clipping value U(n+1) needs to be increased to enhance the average brightness BV of the mapped image M2 obtained in the $(n+1)^{th}$ iteration, and the method proceeds to step S155D.

In step S155C, the clipping value U(n), that is, the clipping value for the $n^{th}$ iteration, is deducted by the value of step(n+1), that is, the value of step adjustment for the $(n+1)^{th}$ iteration, and used as the clipping value U(n+1) for the $(n+1)^{th}$ iteration by the processor 120 according to the formula:

$$U(n+1) = U(n) - \text{step } (n+1).$$

In step S155D, the clipping value U(n), that is, the clipping value for the $n^{th}$ iteration, is added by the value of step(n+1), that is, the value of step adjustment for the $(n+1)^{th}$ iteration, and used as the clipping value U(n+1) for the $(n+1)^{th}$ iteration by the processor 120 according to the formula:

$$U(n+1) = U(n) + \text{step } (n+1).$$

Then, the processor 120 sets n=n+1, and the method returns to step S115. In step S115, the processor 120 proceeds to the next iteration and determines whether the display quality of the mapped image M2 meets the expectation.

The above formulas are exemplified below. Let step_1=15, k=0.5 and η(1)=1. In the $1^{st}$ (n=1) iteration, the values of η(2), step(2) and U(2) for the next (the $(n+1)^{th}$) iteration are obtained by the processor 120 according to the following formulas:

$$\eta(2) = k \times \eta(1) = 0.5; \quad (2)$$

$$\text{step } (2) = \eta(2) \times \text{step\_1} = 0.5 \times 15 = 7.5; \quad (3)$$

$$U(2) = U(1) - \text{step } (2) = 15 - 7.5 = 7.5 \quad (4)$$

(if the average brightness BV is greater than the target brightness BT); or $$U(2) = U(1) + \text{step } (2) = 15 + 7.5 = 22.5 \quad (4)$$

(if the average brightness BV is less than the target brightness BT).

Then, the processor 120 sets n=n+1 (that is, 2=1+1), and performs the $n^{th}$ (that is, the $2^{nd}$) iteration of steps S115 to S155.

In the $2^{nd}$ iteration, the processor 120 obtains the values of η(3), step(3) and U(3) for the next (the $(n+1)^{th}$) iteration according to the following formulas:

$$\eta(3) = k \times \eta(2) = 0.25; \quad (2)$$

$$\text{step } (3) = \eta(3) \times \text{step\_1} = 0.25 \times 15 = 3.75; \quad (3)$$

$$U(3) = U(2) - \text{step } (3) = 7.5 - 3.75 = 3.25 \quad (4)$$

(if the average brightness BV is greater than the target brightness BT); or $$U(3) = U(2) + \text{step } (3) = 7.5 + 3.75 = 11.25 \quad (4)$$

(if the average brightness BV is less than the target brightness BT).

The processor 120 sets n=n+1 (that is, 3=2+1), and performs the next $n^{th}$ (that is, the $3^{rd}$) iteration of step S115 to S155. By the same analogy, the clipping value for the $n^{th}$ iteration (n is a positive integer equivalent to or greater than 4) could be obtained according to the above formulas.

As disclosed above, the clipping value U(n+1) for the $(n+1)^{th}$ iteration attenuates relative to the U(n) for the $n^{th}$ iteration according to an attenuation constant k. For example, when the attenuation constant k is 0.5 (that is, 50%), this indicates that the U(n+1) of the $(n+1)^{th}$ iteration will attenuate by 50% relative to the U(n) of the $n^{th}$ iteration. When the attenuation constant k is 0.7 (that is, 70%), this indicates that the U(n+1) of the $(n+1)^{th}$ iteration will attenuate by 70% relative to the U(n) of the $n^{th}$ iteration.

In another embodiment, the image processing method could also be used in high dynamic image (HDR) and/or wide dynamic image (WDR) processing. For example, the processor 120 is configured to combine several short-exposure or long-exposure images to form a to-be-processed image, wherein the to-be-processed image could be a high dynamic image and/or a wide dynamic image. The processor 120 could process the high dynamic image and/or the wide dynamic image using a method the same as or similar to the image processing method of the to-be-processed image M1 to achieve the same or similar technical effects. The high dynamic image and/or the wide dynamic image have a wide "dynamic range" and a large number of bits. Through the image processing method disclosed above, the processor 120 could convert (or map) an image with a larger number of bits (such as 20 bits) to an image with a smaller number of bits (such as 8 bits). For example, the processor 120 is configured to scale the maximum value of the y axis (cumulative occurrences) of the mapping function D1 (step S130 of FIG. 2) of the to-be-processed image (high dynamic image and/or wide dynamic image) to the cumulative value of the maximum value and each brightness level as set by the user, thus the number of bits of the mapped image could be reduced. To summarize, the image processing method of the invention could provide the high dynamic image and/or the wide dynamic image with the technical effect similar to that of tone mapping and reduce the number of bits of the mapped image, and maintain the wide dynamic range.

To summarize, in the current iteration (such as the $n^{th}$ iteration), the image processing device 100 determines whether the display quality of the to-be-processed image meets the expectation or not according to whether the difference between an average brightness of the to-be-processed or mapped image and a target brightness is less than the threshold value. If the difference is not less than the threshold value, this indicates that the display quality of the to-be-processed image does not meet the expectation, then the image processing device automatically (or proactively) adjusts the clipping value for the next iteration (such as the $(n+1)^{th}$ iteration), and processes the mapped image according to the adjusted clipping value for the next iteration. The mapped image is processed according to the same principles until the difference is less than the threshold value.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, characterized in comprising the following steps:
   (a) receiving a to-be-processed image;
   (b) obtaining a target brightness of the to-be-processed image;
   (c) creating a histogram curve of the to-be-processed image;
   (d) clipping the histogram curve according to a clipping value;
   (e) obtaining a mapping function of the clipped histogram curve;
   (f) obtaining a mapped image mapped according to the mapping function;
   (g) obtaining an average brightness of the mapped image;
   (h) obtaining a difference between the target brightness and the average brightness; and
   (i) if the difference is greater than a threshold value, adjusting the clipping value and repeat step (c)-step (i) until the difference is less than the threshold value.

2. The image processing method according to claim 1, wherein step (d) further comprises:
   distributing the clipped part of the histogram curve to the unclipped part of the histogram curve; and
   wherein step (e) comprises:
   accumulating the clipped histogram curve to obtain the mapping function.

3. The image processing method according to claim 1, wherein the initial value of the clipping value is a fixed value.

4. The image processing method according to claim 1, wherein the target brightness is α times the average brightness of the to-be-processed image; α is a real number.

5. The image processing method according to claim 1, wherein in step (i), the clipping value is adjusted according to the following formulas:

$$\text{step }(n+1) = \eta(n+1) \times \text{step\_1};$$
$$U(n+1) = U(n) \pm \text{step }(n+1);$$

wherein the step_1 is an initial clipping value for the $1^{st}$ iteration; step(n+1) is a value of step adjustment for the $(n+1)^{th}$ iteration; η(n+1) is an adjustment rate for the $(n+1)^{th}$ iteration; U(n) is the clipping value for the $n^{th}$ iteration; U(n+1) is the clipping value for the $(n+1)^{th}$ iteration; n is a positive integer equivalent to or greater than 2.

6. The image processing method according to claim 5, wherein in step (i),
   η(n) is obtained according to the following formula:

$$\eta(n+1) = k \times \eta(n);$$

wherein k is an attenuation constant and is a real number less than 1; η(n) is the adjustment rate for the $n^{th}$ iteration; value of η(1) is 1.

7. The image processing method according to claim 5, wherein step (i) further comprises:
   determining whether the average brightness is greater than the target brightness;
   if the average brightness is greater than the target brightness, decreasing value of step(n+1).

8. The image processing method according to claim 5, wherein step (i) further comprises:
   determining whether the average brightness is greater than the target brightness; and
   if the average brightness is less than the target brightness, increasing the value of step(n+1).

9. The image processing method according to claim 1, wherein the image processing method further comprises:
   combining several images to form a to-be-processed image, wherein the to-be-processed image is a wide dynamic image.

10. An image processing device, characterized in that the image processing device comprises:
   an input port configured to
      (a) receive a to-be-processed image;
   a processor configured to
      (b) obtain a target brightness of the to-be-processed image;
      (c) create a histogram curve of the to-be-processed image;
      (d) clip the histogram curve according to a clipping value;
      (e) obtain a mapping function of the clipped histogram curve;
      (f) obtain a mapped image mapped according to the mapping function;
      (g) obtain an average brightness of the mapped image;
      (h) obtain a difference between the target brightness and the average brightness; and
      (i) if the difference is greater than a threshold value, adjust the clipping value and repeat step (c) to step (i) until the difference is less than the threshold value.

11. The image processing device according to claim 10, wherein the processor further is configured to
   in step (d), distribute the clipped part of the histogram curve to the unclipped part of the histogram curve; and
   in step (e), accumulate the clipped histogram curve to obtain the mapping function.

12. The image processing device according to claim 10, wherein the initial value of the clipping value is a fixed value.

13. The image processing device according to claim 10, wherein the target brightness is $\alpha$ times the average brightness of the to-be-processed image; $\alpha$ is a real number.

14. The image processing device according to claim 10, wherein the processor further is configured to
   in step (i), adjust the clipping value according to the following formulas:

$$\text{step}\,(n+1) = \eta(n+1) \times \text{step\_1};$$
$$U(n+1) = U(n) \pm \text{step}\,(n+1);$$

wherein the step_1 is the initial clipping value for the $1^{st}$ iteration; step(n+1) is value of step adjustment for the $(n+1)^{th}$ iteration; $\eta(n+1)$ is the adjustment rate for the $(n+1)^{th}$ iteration; U(n) is the clipping value for the $n^{th}$ iteration; U(n+1) is the clipping value for the $(n+1)^{th}$ iteration; n is a positive integer equivalent to or greater than 2.

15. The image processing device according to claim 14, wherein the processor further is configured to
   in step (i), obtain $\eta(n)$ according to the following formula:

$$\eta(n+1) = k \times \eta(n);$$

wherein k is an attenuation constant and is a real number less than 1; $\eta(n)$ is the adjustment rate for the $n^{th}$ iteration; value of $\eta(1)$ is 1.

16. The image processing device according to claim 14, wherein the processor further is configured to
   in step (i), determine whether the average brightness is greater than the target brightness; and
   if the average brightness is greater than the target brightness, decrease the value of step(n+1).

17. The image processing device according to claim 14, wherein the processor further is configured to
   in step (i), determine whether the average brightness is greater than the target brightness; and
   if the average brightness is less than the target brightness, increase the value of step(n+1).

18. The image processing device according to claim 10, wherein the processor further is configured to
   combine several images to form a to-be-processed image, wherein the to-be-processed image is a wide dynamic image.

* * * * *